(12) United States Patent
Kondo et al.

(10) Patent No.: US 7,760,198 B2
(45) Date of Patent: *Jul. 20, 2010

(54) DISPLAY CONTROLLER

(75) Inventors: Yoshimasa Kondo, Matsumoto (JP); Yasuhiko Hanawa, Kobuchizawa (JP)

(73) Assignee: Seiko Epson Corporation (JP)

( * ) Notice: Subject to any disclaimer, the term of this patent is extended or adjusted under 35 U.S.C. 154(b) by 1055 days.

This patent is subject to a terminal disclaimer.

(21) Appl. No.: 11/319,077

(22) Filed: Dec. 27, 2005

(65) Prior Publication Data

US 2006/0143337 A1 Jun. 29, 2006

(30) Foreign Application Priority Data

Dec. 28, 2004 (JP) ............................. 2004-380985

(51) Int. Cl.
G09G 5/00 (2006.01)
(52) U.S. Cl. ........................................ 345/204; 710/58
(58) Field of Classification Search ................. 345/204, 345/475, 619; 710/58; 379/88.13; 340/815.4, 340/825.22, 825.27
See application file for complete search history.

(56) References Cited

U.S. PATENT DOCUMENTS

| 5,703,658 | A  | * | 12/1997 | Tsuru et al. ................. 348/554 |
| 5,809,245 | A  | * | 9/1998  | Zenda ......................... 709/217 |
| 7,356,189 | B2 |   | 4/2008  | Kondo et al. |
| 2004/0190625 | A1 | * | 9/2004 | He et al. ................. 375/240.18 |
| 2006/0143615 | A1 | * | 6/2006 | Kondo et al. ................. 718/100 |

FOREIGN PATENT DOCUMENTS

| JP | 2000-235494 | 8/2000 |
| JP | 2004-356851 | 12/2004 |

OTHER PUBLICATIONS

MPEG-4 Visual Part, "Annex L (informative) Rate control", ISO/IEC 14496-2 (E), pp. 311-321 (1999).
MPEG-4 Visual Part, "Annex L (informative) Rate control", ISO/IEC 14496-2 (E), pp. 475-486 (2001).

* cited by examiner

Primary Examiner—Abbas I Abdulselam
(74) Attorney, Agent, or Firm—Harness, Dickey & Pierce, P.L.C.

(57) ABSTRACT

A display controller including: a host I/F which performs interface processing between the display controller and a host CPU; a memory into which a multimedia processing program is loaded, when the host CPU has read the multimedia processing program from a multimedia processing program group stored in a host memory and transmitted the multimedia processing program to the display controller; a built-in CPU which executes a software processing portion of the multimedia processing assigned to software processing based on the multimedia processing program; and an H/W accelerator which executes a hardware processing portion of the multimedia processing assigned to hardware processing.

15 Claims, 15 Drawing Sheets

FIG.5A

DCT COEFFICIENT

HIGHER FREQUENCY →

HIGHER FREQUENCY ↓

| 224 | 130 | 40 | 16 | 11 | 8 | -2 | -1 |
|---|---|---|---|---|---|---|---|
| 41 | -34 | -14 | -10 | -4 | 0 | -1 | 3 |
| -7 | 10 | -12 | 2 | 2 | -5 | 1 | -1 |
| 22 | -7 | 9 | 2 | 0 | 0 | -3 | 2 |
| -8 | 4 | -6 | 3 | -1 | -2 | 4 | -1 |
| 5 | 2 | -1 | -4 | 0 | 1 | -1 | -1 |
| 4 | -5 | 3 | -1 | 0 | 2 | 0 | -1 |
| -5 | 5 | -2 | 3 | 0 | -2 | 1 | -1 |

FIG.5B

QUANTIZATION TABLE

| 8 | 6 | 5 | 8 | 12 | 20 | 26 | 30 |
|---|---|---|---|---|---|---|---|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG.5C

QUANTIZED DCT COEFFICIENT

| 28 | 22 | 8 | 2 | 1 | 0 | 0 | 0 |
|---|---|---|---|---|---|---|---|
| 7 | -6 | -2 | -1 | 0 | 0 | 0 | 0 |
| -1 | 1 | -2 | 0 | 0 | 0 | 0 | 0 |
| 3 | -1 | 1 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

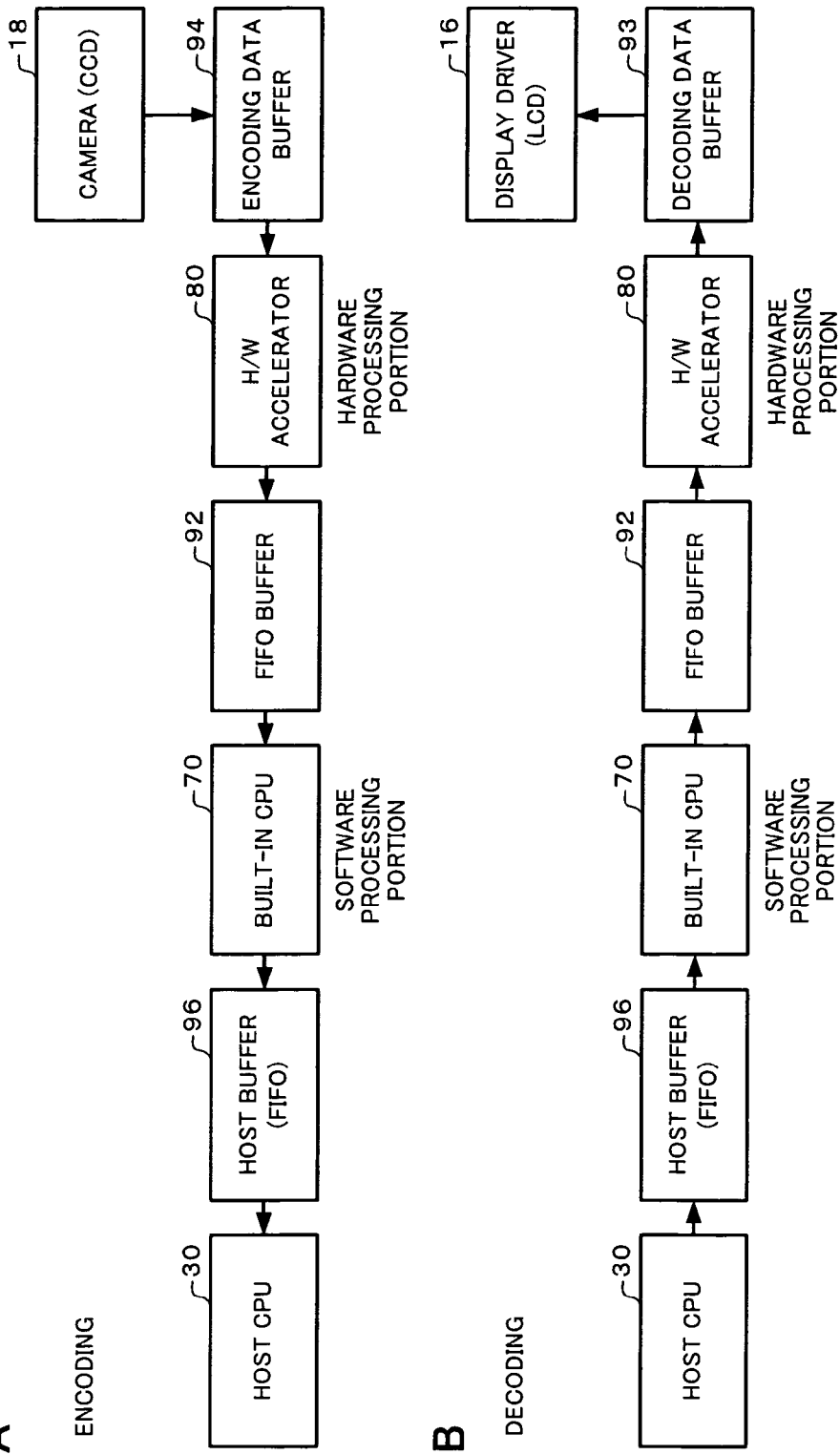

FIG. 10A

| |
|---|
| VOP WIDTH |
| VOP HEIGHT |
| DECODING TYPE (MPEG4, H. 263) |
| RESYNC MARKER FLAG (ENABLE/DISABLE) |
| DATA PARTITIONING FLAG (ENABLE/DISABLE) |
| REVERSE VLC FLAG (ENABLE/DISABLE) |
| PICTURE TYPE (I PICTURE, P PICTURE) |
| VOPQP VALUE (1 TO 31) |
| ⋮ |

FIG. 10B

| |
|---|
| VOP WIDTH |
| VOP HEIGHT |
| DECODING TYPE (MPEG4, H. 263) |
| RESYNC MARKER FLAG (ENABLE/DISABLE) |
| DATA PARTITIONING FLAG (ENABLE/DISABLE) |
| REVERSE VLC FLAG (ENABLE/DISABLE) |
| ⋮ |

FIG.15

| VALUE | NAME | HOST CPU - BUILT-IN CPU |
|---|---|---|
| 10h | STARTUP STATUS | ← |
| 20h | DECODE RESET | → |
| 30h | DECODE START | → |
| 40h | ENCODE START | → |
| 01h | ACK RESPONSE | ↔ |
| 02h | NACK RESPONSE | ↔ |

DISPLAY CONTROLLER

Japanese Patent Application No. 2004-380985, filed on Dec. 28, 2004, is hereby incorporated by reference in its entirety.

BACKGROUND OF THE INVENTION

The present invention relates to a display controller.

Moving Picture Experts Group Phase 4 (MPEG-4) has been standardized as a coding method for multimedia information such as video data, still image data, and sound data (MPEG-4 Visual Part (ISO/IEC 14496-2: 1999 (E))). In recent years, a portable electronic instrument such as a portable telephone is provided with an encoding/decoding function compliant with the MPEG-4 standard. Such an encoding/decoding function enables a portable telephone to encode video data obtained by using a camera (CCD) and transmit the encoded data to another portable telephone (server), or to decode video data received from another portable telephone (server) through an antenna and display the decoded video data in a display (LCD) panel.

When performing multimedia processing such as MPEG-4 encoding/decoding processing, a series of processing may be entirely implemented by using a hardware processing circuit (ASIC) (first method).

However, since the scale of the hardware processing circuit is increased by using the first method, it is difficult to deal with a demand for a reduction in size of the portable electronic instrument and a reduction in power consumption.

A portable electronic instrument such as a portable telephone includes a host central processing unit (CPU) for controlling the entire instrument and realizing a baseband engine (communication processing). Therefore, multimedia processing such as MPEG-4 processing may be implemented by software processing using the host CPU (second method).

However, since the second method increases the processing load imposed on the host CPU, the time necessary for the host CPU to perform processing other than the multimedia processing is limited, whereby the performance of the electronic instrument including the host CPU is decreased. Moreover, since the processing time of the host CPU is increased, power consumption is increased, so that it is difficult to deal with a demand for a reduction in power consumption in order to increase the battery life.

As a third method, multimedia processing may be implemented by using a host CPU and a digital signal processor (DSP). Specifically, the entire multimedia processing program group for encoding and decoding video (MPEG) data, still image (JPEG) data, and sound (audio and voice) data is stored in a built-in memory (nonvolatile memory such as a flash ROM) of the DSP. The host CPU transmits a start command, and the DSP executes a multimedia processing program indicated by the start command.

However, the third method requires that the DSP execute a series of complicated multimedia processing. Therefore, as the number of types of codec is increased or the number of types of additional processing such as stream data multiplexing/separation is increased, the architecture of assigning the entire multimedia processing to the DSP becomes meaningless, so that the performance of the DSP and the system is decreased. Moreover, since the clock frequency of the DSP must be increased in order to deal with the multimedia processing which has become complicated, problems such as an increase in power consumption and generation of heat occur. Furthermore, since the third method requires that the entire multimedia processing program group be stored in the built-in memory (flash ROM) of the DSP, power consumption and product cost are increased due to an increase in the capacity of the memory.

SUMMARY

According to a first aspect of the invention, there is provided a display controller for performing multimedia processing which is encoding or decoding processing of video data, still image data, or sound data, the display controller comprising:

a host interface which performs interface processing between the display controller and a host processor;

a memory into which a multimedia processing program is loaded, when the host processor has read the multimedia processing program from a multimedia processing program group stored in a host memory and transmitted the multimedia processing program to the display controller;

a built-in processor which executes a software processing portion of the multimedia processing assigned to software processing based on the loaded multimedia processing program; and a first hardware accelerator which executes a hardware processing portion of the multimedia processing assigned to hardware processing.

BRIEF DESCRIPTION OF THE SEVERAL VIEWS OF THE DRAWING

FIGS. 5A to 5C are illustrative of DCT and quantization.

FIGS. 6A and 6B are illustrative of a method of using a FIFO buffer.

FIGS. 10A and 10B are illustrative of an information area.

FIG. 15 is illustrative of examples of a command and status transferred by handshake communication.

DETAILED DESCRIPTION OF THE EMBODIMENT

Figure 1:
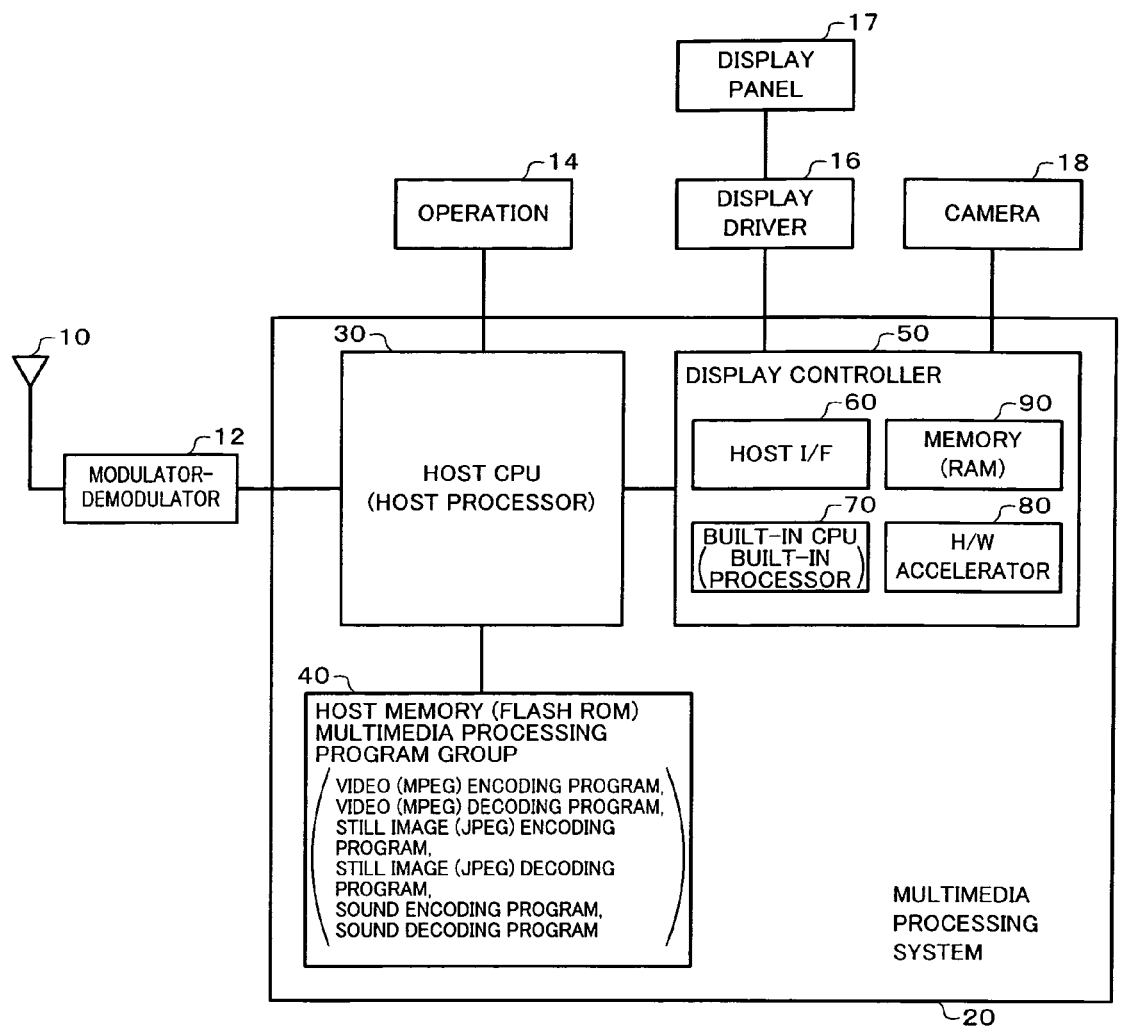
FIG. 1 is a configuration example of an electronic instrument and a multimedia processing system according to one embodiment of the invention.

The invention may provide a display controller which can efficiently execute multimedia processing.

According to one embodiment of the invention, there is provided a display controller for performing multimedia processing which is encoding or decoding processing of video data, still image data, or sound data, the display controller comprising:

a host interface which performs interface processing between the display controller and a host processor;

a memory into which a multimedia processing program is loaded, when the host processor has read the multimedia processing program from a multimedia processing program group stored in a host memory and transmitted the multimedia processing program to the display controller;

a built-in processor which executes a software processing portion of the multimedia processing assigned to software processing based on the loaded multimedia processing program; and a first hardware accelerator which executes a hardware processing portion of the multimedia processing assigned to hardware processing.

In this embodiment, the multimedia processing program selected from the multimedia processing program group stored in the host memory is loaded into the memory of the display controller. The built-in processor executes the software processing portion of the multimedia processing based on the loaded multimedia processing program, and the first hardware accelerator executes the hardware processing portion of the multimedia processing. This enables efficient execution of the multimedia processing. Moreover, since it is unnecessary to load all the multimedia processing programs into the memory of the display controller, the storage capacity of the memory can be saved. Furthermore, it is possible to flexibly deal with complication of the multimedia processing.

In this display controller, the built-in processor may be released from a reset state when the host processor has directed reset release, and execute the multimedia processing program after being released from the reset state.

This enables the built-in processor to be released from the reset state and execute the multimedia processing program as required, whereby power consumption can be reduced.

In this display controller, the built-in processor may transition to a command wait state, in which the built-in processor waits for reception of a command from the host processor, after being released from the reset state, and execute the multimedia processing program when the built-in processor has been directed by the host processor to start executing the multimedia processing program in the command wait state.

This enables efficient execution of the multimedia processing under control of the host processor.

In this display controller, the multimedia processing program may be an encoding processing program for executing a software processing portion of encoding processing of video data;

the first hardware accelerator may perform discrete cosine transform processing, quantization processing, inverse quantization processing, inverse discrete cosine transform processing, motion compensation processing, and motion estimation processing as the hardware processing portion; and the built-in processor may perform variable length code encoding processing as the software processing portion.

According to this feature, the hardware processing portion, of which the processing load is heavy and which may not be changed, such as the discrete cosine transform processing and the quantization processing, is executed by the first hardware accelerator. On the other hand, the software processing portion, of which the processing load is comparatively low and for which flexible programming is required, is executed by the built-in processor. Such a role assignment enables further efficient execution of the encoding processing of the multimedia processing.

In this display controller, the first hardware accelerator may perform scanning processing in the case of interframe coding; and the built-in processor may perform DC prediction processing and scanning processing in the case of intraframe coding.

This enables execution of the encoding processing of the multimedia processing while suitably assigning the roles corresponding to the type of coding.

In this display controller, the multimedia processing program may be an encoding processing program for executing a software processing portion of encoding processing of video data;

when the first hardware accelerator has been directed by the host processor to start executing the encoding processing, the first hardware accelerator may execute the hardware processing portion of the encoding processing for video data written into an encoding data buffer, and write the resulting video data into a FIFO buffer; and when the built-in processor has been directed by the host processor to start executing the encoding processing program, the built-in processor may execute the software processing portion of the encoding processing for the video data written into the FIFO buffer based on the encoding processing program, and write the resulting video data into a host buffer.

The encoding processing of the multimedia processing can be smoothly and efficiently executed under control of the host processor by utilizing the FIFO buffer as described above.

In this display controller, the multimedia processing program may be a decoding processing program for executing a software processing portion of decoding processing of video data;

the built-in processor may perform variable length code decoding processing as the software processing portion based on the decoding processing program; and the first hardware accelerator may perform inverse quantization processing, inverse discrete cosine transform processing, and motion compensation processing as the hardware processing portion.

According to this feature, the hardware processing portion, of which the processing load is heavy and which may not be changed, such as the inverse quantization processing and the inverse discrete cosine transform processing, is executed by the first hardware accelerator. On the other hand, the software processing portion, of which the processing load is comparatively low and for which flexible programming is required, is executed by the built-in processor. Such a role assignment enables further efficient execution of the decoding processing of the multimedia processing.

In this display controller, the built-in processor may perform inverse scanning processing and inverse DC/AC prediction processing in the case of intraframe coding; and the first hardware accelerator may perform inverse scanning processing in the case of interframe coding.

This enables execution of the decoding processing of the multimedia processing while suitably assigning the roles corresponding to the type of coding.

In this display controller, the multimedia processing program may be a decoding processing program for executing a software processing portion of decoding processing of video data;

when the built-in processor has been directed by the host processor to start executing the decoding processing program, the built-in processor may execute the software processing portion of the decoding processing for the video data written into a host buffer based on the decoding processing program, and write the resulting video data into a FIFO buffer; and when the first hardware accelerator has been directed by the host processor to start executing the decoding processing, the first hardware accelerator may execute the hardware processing portion of the decoding processing for video data written into the FIFO buffer, and write the resulting video data into a decoding data buffer.

The decoding processing of the multimedia processing can be smoothly and efficiently executed under control of the host processor by utilizing the FIFO buffer as described above.

In this display controller, the multimedia processing program may be a decoding processing program for executing a software processing portion of decoding processing of video data; and when an error has occurred during the decoding processing, the built-in processor may notify the host processor of occurrence of the error and allow the host processor to execute the software processing portion of the decoding processing.

Therefore, even if a decoding error has occurred, the subsequent hardware processing portion can be appropriately executed by recovering from such an error.

This display controller may comprise:

a second hardware accelerator controlled by the built-in processor and assisting a part of the software processing portion of the multimedia processing.

One embodiment of the invention will be described in detail below. Note that the embodiment described below do not in any way limit the scope of the invention laid out in the claims herein. In addition, not all of the elements of the embodiment described below should be taken as essential requirements of the invention.

1. Configuration

FIG. 1 shows a configuration example of a multimedia processing system including a display controller according to one embodiment of the invention and an electronic instrument including the multimedia processing system. The configurations of the multimedia processing system, the electronic instrument, and the display controller are not limited to the configurations shown in FIG. 1. Some of the constituent elements shown in FIG. 1 may be omitted, or another constituent element may be additionally provided.

FIG. 1 shows an example in which the electronic instrument including a multimedia processing system 20 is a portable telephone. The portable telephone (electronic instrument in a broad sense) shown in FIG. 1 includes an antenna 10, a modulator-demodulator 12, an operation section 14, a display driver 16, a display panel 17, a camera 18, and the multimedia processing system 20. The multimedia processing system 20 includes a host CPU 30 (host processor in a broad sense), a host memory 40, and a display controller 50.

Data (video data or MPEG stream) received from another instrument (portable telephone or server) through the antenna 10 is demodulated by the modulator-demodulator 12 and supplied to the host CPU 30. Data from the host CPU 30 is modulated by the modulator-demodulator 12 and transmitted to another instrument through the antenna 10.

Operation information from the user is input through the operation section 14 (operational button). Data communication processing, data encoding/decoding processing, processing of displaying an image in the display panel 17, imaging processing of the camera 18 (camera module), or the like is performed based on the operation information under control of the host CPU 30.

The display panel 17 is driven by the display driver 16. The display panel 17 includes scan lines, data lines, and pixels. The display driver 17 has a function of a scan driver which drives (selects) the scan lines and a function of a data driver which supplies voltage corresponding to image data (display data) to the data lines. The display controller 50 is connected with the display driver 16, and supplies image data to the display driver 16. A liquid crystal display (LCD) panel may be used as the display panel 17. However, the display panel 17 is not limited to the LCD panel. The display panel 17 may be an electroluminescence display panel, a plasma display panel, or the like.

The camera 18 includes a charge-coupled device (CCD). The camera 18 supplies image data obtained by using the CCD to the display controller 50 in a YUV format.

The host CPU 30 accesses the host memory 40 and performs host processing. In more detail, the host CPU 30 performs processing of controlling the display controller 50, processing of controlling the entire instrument, processing of a baseband engine (communication processing engine), or the like. The host memory 40 stores various programs. The host CPU 30 operates under the program stored in the host memory 40 and realizes software processing. The host memory 40 may be realized by using a nonvolatile memory such as a flash ROM, a RAM, or the like.

The display controller 50 controls the display driver 16. The display controller 50 includes a host interface 60, a built-in CPU 70 (built-in processor in a broad sense), a hardware accelerator 80, and a memory 90. In the specification and the drawings, the terms "interface", "hardware", and "software" may be appropriately abbreviated as "I/F", "H/W", and "S/W", respectively.

The display controller 50 (image controller) encodes image data (video data or still image data) from the camera 18, and transmits the encoded image data to the host CPU 30. The host CPU 30 saves the encoded image data as a file, or transmits the encoded image data to another instrument through the modulator-demodulator 12 and the antenna 10.

The display controller 50 decodes image data (encoded data or compressed data) received from the host CPU 30, and supplies the decoded image data to the display driver 16 to allow the display driver 16 to display an image in the display panel 17. The display controller 50 may receive image data obtained by using the camera 18 and supply the image data to the display driver 16 to allow the display driver 16 to display an image in the display panel 17.

The host memory 40 stores a multimedia processing program group. The multimedia processing used herein refers to encoding (compression) or decoding (decompression) processing of video data, still image data, or sound (audio or voice) data. The multimedia processing program used herein refers to a video (MPEG in a narrow sense) encoding program, a video decoding program, a still image (JPEG in a narrow sense) encoding program, a still image decoding program, a sound encoding program, a sound decoding program, or the like. A codec program containing a set of an encoding program and a decoding program may be stored in the host memory 40 as the multimedia processing program.

In this embodiment, the host CPU 30 (host processor or host in a broad sense) reads the multimedia processing program selected from the multimedia processing program group stored in the host memory 40, and transmits the read program to the display controller 50. The transmitted multimedia processing program is loaded into the memory 90 of the display controller 50.

In more detail, when it is necessary to encode a video, the host CPU 30 reads the encoding processing program for executing the software processing portion of video data encoding processing from the host memory 40, and transmits the read program to the display controller 50. For example, when saving video data (original data) obtained by using the camera 18 as a file or transmitting the video data to another instrument through the antenna 10, the host CPU 30 reads the video (MPEG) encoding processing program from the host memory 40 and transmits the read program to the display controller 50. The encoding target video data is input to the display controller 50 from the camera 18, for example.

When it is necessary to decode a video, the host CPU 30 reads the decoding processing program for executing the software processing portion of video data decoding processing from the host memory 40, and transmits the read program to the display controller 50. For example, when displaying video data (encoded data or compressed data) received from another instrument through the antenna 10 or video data (encoded data or compressed data) saved as a file in the display panel 17, the host CPU 30 reads the video (MPEG) decoding processing program from the host memory 40 and transmits the read program to the display controller 50. The host CPU 30 transmits the decoding target video data (original data) to the display controller 50.

As described above, a necessary multimedia processing program is selected from the multimedia processing program group by the host CPU 30, and loaded into the memory 90 of the display controller 50. Therefore, since the storage capacity of the memory 90 (RAM) can be saved, the scale of the memory 90 can be reduced, so that cost of the display controller 50 can be reduced. Moreover, since the amount of data loaded at a time can be reduced, a problem in which a long time is required for startup or restart after occurrence of a hang-up can be prevented.

The host I/F 60 included in the display controller 50 performs interface processing between the display controller 50 and the host CPU 30. In more detail, the host I/F 60 performs processing of transmitting or receiving a command, data, or status to or from the host CPU 30 (handshake processing). The host I/F 60 generates an interrupt signal transmitted from the display controller 50 to the host CPU 30. The host I/F 60 may be provided with a data direct memory access (DMA) transfer function.

The built-in CPU 70 (built-in processor in a broad sense) included in the display controller 50 controls the entire display controller 50 and each section of the display controller 50. In this embodiment, the built-in CPU 70 (RISC processor) executes the software processing portion of the multimedia processing assigned to software processing based on the multimedia processing program loaded into the memory 90. The software processing portion is a portion processed by the built-in CPU 70 which has read the multimedia processing program.

In more detail, the host CPU 30 sets the built-in CPU 70 in a reset state by directing reset of the built-in CPU 70 (by transmitting a reset command). After transmitting the multimedia processing program and causing the multimedia processing program to be loaded into the memory 90, the host CPU 30 directs reset release (transmits a reset release command) to release the built-in CPU 70 from the reset state. After the built-in CPU 70 has been released from the reset state, the host CPU 30 directs the built-in CPU 70 to start executing the multimedia processing program (transmits an execution start command). The built-in CPU 70 is released from the reset state when reset release is directed by the host CPU 30. After the built-in CPU 70 has been released from the reset state, the built-in CPU 70 executes the multimedia processing program loaded into the memory 90.

After the built-in CPU 70 has been released from the reset state, the built-in CPU 70 transitions to a command wait state in which the built-in CPU 70 waits for reception of a command (multimedia processing start command) from the host CPU 30. When the built-in CPU 70 in the command wait state has been directed by the host CPU 30 to start executing the multimedia processing program (when the built-in CPU 70 has received the multimedia processing start command), the built-in CPU 70 executes the multimedia processing program.

After transmitting the multimedia processing program and causing the multimedia processing program to be loaded into the memory 90, the host CPU 30 performs protection (write protection) processing for a multimedia processing program loading area (91 in FIG. 2) before the built-in CPU 70 is released from the reset state.

The host CPU 30 performs preprocessing including at least one of multiplexing processing (video/audio multiplexing and video/audio packet fragmentation), separation processing (video/audio separation), and upper-layer header analysis processing (analysis of VOS, VO, VOL, and GOV headers) for stream data (MPEG stream) having a layered structure and being the multimedia processing target. The host CPU 30 sets information (data or parameter) obtained by the preprocessing in an information area (99 in FIG. 2) to notify the built-in CPU 70 of the information. The built-in CPU 70 performs lower-layer header analysis processing (VOP header analysis) of stream data (MPEG stream). The built-in CPU 70 executes the software processing portion of the multimedia processing based on the information (data or parameter) set in the information area.

The H/W accelerator 80 (first H/W accelerator) included in the display controller 50 is a circuit (hardware processing circuit) which executes the hardware processing portion of the multimedia processing assigned to hardware processing. The hardware processing portion is a portion processed by a dedicated circuit other than a processor.

The memory 90 included in the display controller 50 functions as a program loading area, a data buffer area, and a work area for the built-in CPU 70. In more detail, the multimedia processing program read from the host memory 40 by the host CPU 30 is loaded into the program loading area of the memory 90. Encoded data or decoded data is buffered in the buffer area (FIFO area) of the memory 90. The built-in CPU 70 expands a table or the like into the work area of the memory 90 and performs processing. The memory 90 may be realized by using a RAM (SRAM or DRAM) or the like.

Figure 2:
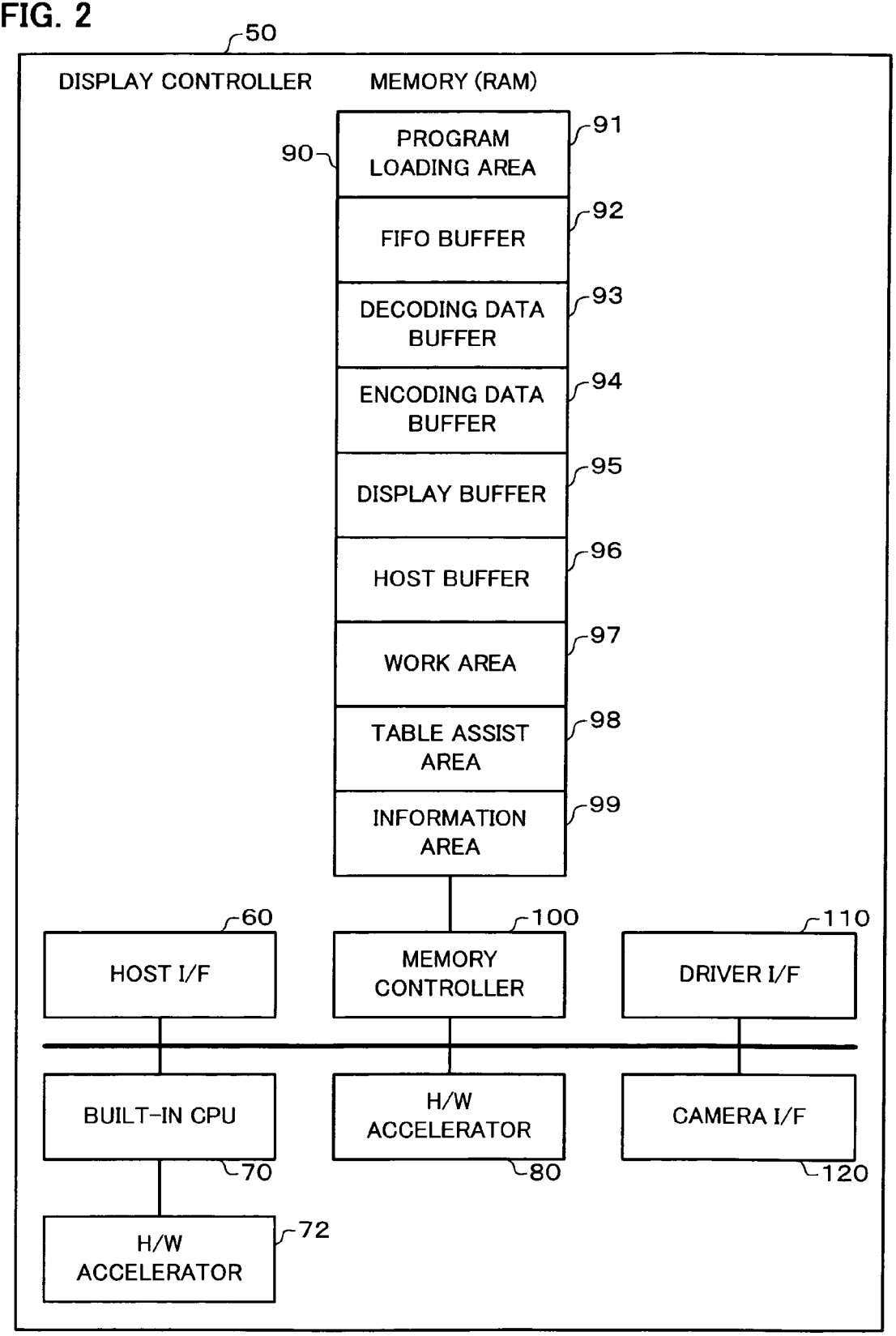
FIG. 2 is a configuration example of a display controller according to one embodiment of the invention.

FIG. 2 shows a detailed configuration example of the display controller. Note that the configuration of the display controller is not limited to the configuration shown in FIG. 2. Some of the constituent elements shown in FIG. 2 may be omitted, or another constituent element may be additionally provided.

As shown in FIG. 2, a program loading area 91, a FIFO buffer 92 (MPEG-4 FIFO), a decoding data buffer 93 (MPEG-4 decoding buffer), an encoding data buffer 94 (MPEG-4 encoding buffer), a display buffer 95, a host buffer 96 (Huffman FIFO), a work area 97, and a table assist area 98, and an information area 99 are reserved (mapped) in the memory 90. These areas and buffers may be realized by using a physically identical memory or physically different memories.

A memory controller 100 controls access (read or write access) to the memory 90. Specifically, the memory controller 100 arbitrates among accesses from the host I/F 60, the built-in CPU 70, the H/W accelerator 80, a driver I/F 110, and a camera I/F 120. The memory controller 100 generates a write address or a read address of the memory 90 to control a write pointer or a read pointer, and reads data or a program from the memory 90 or writes data or a program into the memory 90. For example, the multimedia processing program can be loaded into the program loading area 91 by the memory controller 100.

The driver I/F 110 performs interface processing between the display controller 50 and the display driver 16. In more detail, the driver I/F 110 performs processing of transmitting image data (video data or still image data) to the display driver 16, processing of generating various control signals for the display driver 16, or the like.

The camera I/F 120 performs interface processing between the display controller 50 and the camera 18. For example, the camera 18 outputs image data obtained by imaging in a YUV format, and outputs a synchronization signal (e.g. VSYNC) indicating the end of one frame. The camera I/F 120 takes in the image data from the camera 18 based on the synchronization signal.

In FIG. 2, a H/W accelerator 72 (second accelerator) is connected with the built-in CPU 70. The H/W accelerator 72 is a circuit (hardware processing circuit) which is controlled by the built-in CPU 70 and assists a part of the software processing portion of the multimedia processing. In more detail, the H/W accelerator 72 assists the built-in CPU 70 in a part of variable length code (VLC) encoding processing and VLC decoding processing. For example, the H/W accelerator 72 performs processing of generating an index number of a table necessary for the variable length code processing in place of the built-in CPU 70. In this case, the H/W accelerator 72 uses the table assist area 98 of the memory 90 as a work area.

2. Encoding/Decoding Processing

The MPEG-4 encoding/decoding processing according to this embodiment is described below with reference to FIGS. 3 and 4.

Figure 3:
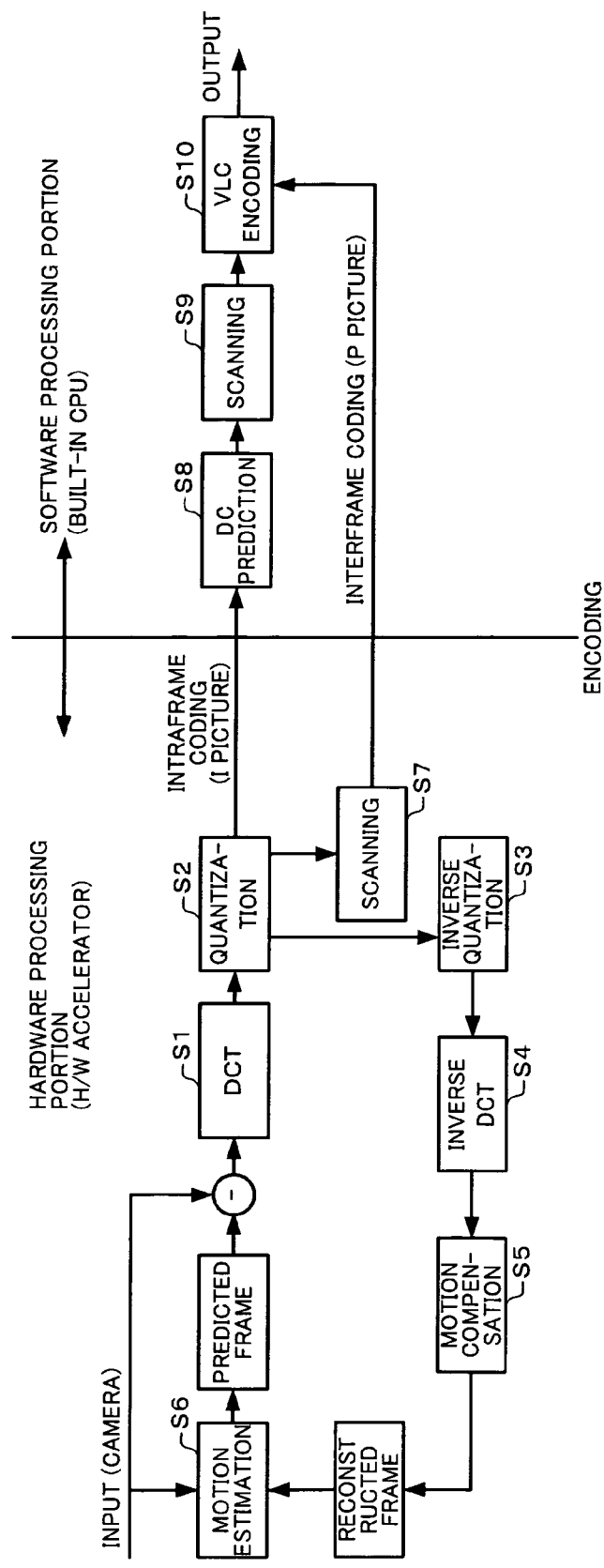
FIG. 3 is illustrative of encoding processing.

In the encoding processing shown in FIG. 3, input image data for one video object plane (VOP) (image data for one frame) is divided into macroblocks (basic processing units). One macroblock is made up of six blocks. Each block is subjected to discrete cosine transform (DCT) processing (step S1). Discrete cosine transform is performed in units of 8×8 pixel blocks, in which DCT coefficients are calculated in block units. The DCT coefficients after discrete cosine transform indicate a change in light and shade of an image in one block by the average brightness (DC component) and the spatial frequency (AC component). FIG. 5A shows an example of the DCT coefficients in one 8×8 pixel block. The DCT coefficient at the upper left corner in FIG. 5A indicates the DC component, and the remaining DCT coefficients indicate the AC components. Image recognition is not affected to a large extent even if high-frequency components of the AC components are omitted.

Then, the DCT coefficients are quantized (step S2). Quantization is performed in order to reduce the amount of information by dividing each DCT coefficient in one block by a quantization step value at a corresponding position in a quantization table. FIG. 5C shows the DCT coefficients in one block when quantizing the DCT coefficients shown in FIG. 5A by using the quantization table shown in FIG. 5B. As shown in FIG. 5C, most of the DCT coefficients of the high-frequency components become zero data by dividing the DCT coefficients by the quantization step values and rounding off to the nearest whole number, whereby the amount of information is significantly reduced.

As shown in FIG. 3, in the case of intraframe coding (I picture), DC (direct current) prediction processing, scanning processing, and variable length code (VLC) encoding processing are performed (steps S8, S9, and S10). The DC prediction processing (step S8) is processing of determining the predicted value of the DC component in the block. The scanning processing (step S9) is processing of scanning (zigzag scanning) the block from the low-frequency side to the high-frequency side. The VLC encoding processing (step S10) is also called entropy coding and has a coding principle in which a component with a higher emergence frequency is indicated by using a smaller amount of code. In the case of interframe coding (P picture), the DC prediction processing is unnecessary and only the scanning processing (step S7) is performed. The VLC encoding processing (step S10) is performed for data obtained after the scanning processing.

In the encoding processing, a feed-back route is necessary in order to perform motion estimation (ME) processing between the current frame and the next frame. As shown in FIG. 3, inverse quantization processing, inverse DCT processing, and motion compensation (MC) processing are performed in the feed-back route (local decoding processing) (steps S3, S4, and S5). The ME processing is performed based on the resulting reconstructed frame (reference VOP) so that the motion vector is detected. A predicted frame (predicted macroblock) is determined based on the detected motion vector. The DCT processing and the quantization processing are performed for the difference between the encoding target frame and the predicted frame (steps S1 and S2).

Figure 4:
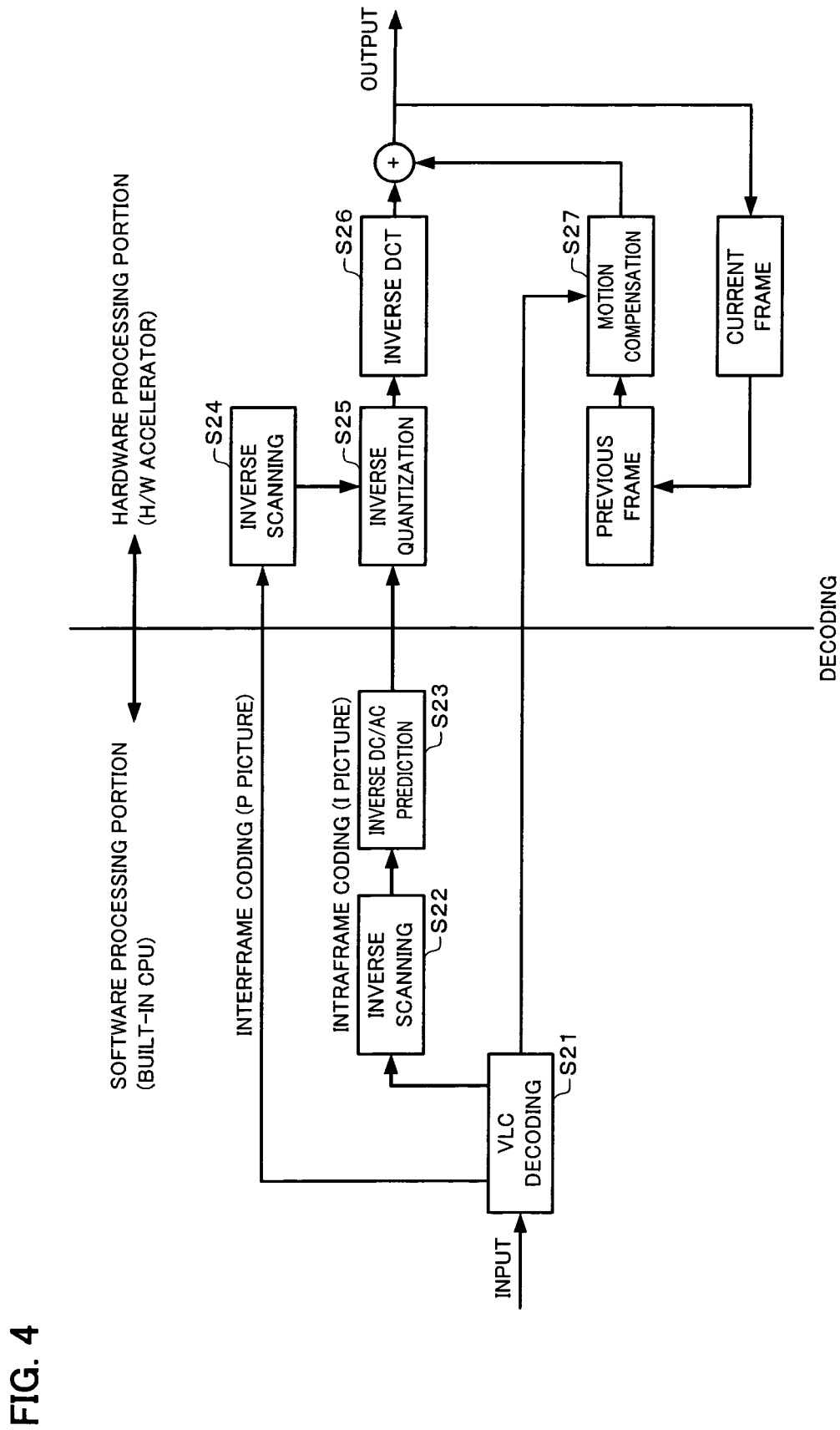
FIG. 4 is illustrative of decoding processing.

The decoding processing shown in FIG. 4 is realized by performing the inverse processing of the encoding processing shown in FIG. 3 in the opposite order. Specifically, variable length code (VLC) decoding processing is performed (step S21). In the case of intraframe coding (I picture), inverse scanning processing and inverse DC/AC prediction processing are performed (steps S22 and S23). In the case of interframe coding (P picture), only the inverse scanning processing is performed without performing the inverse DC/AC prediction processing (steps S24).

Then, inverse quantization processing and inverse DCT processing are performed (steps S25 and S26). Then, motion compensation processing is performed based on the data in the preceding frame and the data after the VLC decoding processing (step S27), and additive processing of the resulting data and the data after the inverse DCT processing is performed.

In this embodiment, when the multimedia processing program loaded into the memory 90 is the video encoding processing program, the H/W accelerator 80 executes the hardware processing portion including the DCT processing, the quantization processing, the inverse quantization processing, the inverse DCT processing, the motion compensation processing, and the motion estimation processing (steps S1 to S6), as shown in FIG. 3. The built-in CPU 70 performs the VLC encoding processing (step S10), which is the software processing portion, based on the encoding processing program. In more detail, the H/W accelerator 80 performs the scanning processing (step S7) in the case of interframe coding (P picture). In the case of intraframe coding (I picture), the built-in CPU 70 performs the DC prediction (DC/AC prediction) processing and the scanning processing (steps S8 and S9).

In this embodiment, when the multimedia processing program loaded into the memory 90 is the video decoding processing program, the built-in CPU 70 performs the VLC decoding processing (step S21), which is the software processing portion, based on the decoding processing program, as shown in FIG. 4. The H/W accelerator 80 executes the hardware processing portion including the inverse quantization processing, the inverse DCT processing, and the motion compensation processing (steps S25, S26, and S27). In more detail, in the case of intraframe coding (I picture), the built-in CPU 70 performs the inverse scanning processing and the inverse DC/AC prediction processing (steps S22 and S23). In the case of interframe coding (P picture), the H/W accelerator 80 performs the inverse scanning processing (step S24).

In this embodiment, when a decoding error occurs during the decoding processing of the built-in CPU 70, the host CPU 30 executes the software processing portion (steps S21 to S23) of the decoding processing in place of the built-in CPU 70.

In this embodiment, the software processing portion and the hardware processing portion are realized by assigning the roles as shown in FIGS. 3 and 4 for the following reasons.

Specifically, most of the data in each block is zero data as shown in FIG. 5C after the quantization processing in the step S2 in FIG. 3, so that the amount of information is significantly small in comparison with the data before the quantization processing shown in FIG. 5A. Moreover, the calculation load of the processing in the steps S8 to S10 is small. Therefore, no problem occurs even if the processing in the steps S8 to S10 is realized by software processing using the built-in CPU 70 which does not have high calculation performance. The software processing using the built-in CPU 70 is low-speed, but allows flexible programming. Therefore, the software processing using the built-in CPU 70 is suitable for compensating for the processing portion of the multimedia processing, which is low-load processing but requires flexible programming.

On the other hand, the DCT processing, the quantization processing, the inverse quantization processing, the inverse DCT processing, the motion compensation processing, and the motion estimation processing in the steps S1 to S6 in FIG. 3 are heavy load processing since the amount of information is large, and require high-speed processing. Therefore, the processing in the steps S1 to S6 is not suitable for software processing. Moreover, since the processing in the steps S1 to S6 has been standardized to a certain extent, it will be unnecessary to change the processing in the future. Therefore, the processing in the steps S1 to S6 is suitable for hardware processing using a dedicated hardware circuit (i.e. H/W accelerator 80). Moreover, since most of the processing in the steps S1 to S6 is repeated processing, the processing in the steps S1 to S6 is suitable for hardware processing. Since the amount of data is small after the quantization processing in the step S2, the amount of data transferred to the built-in CPU 70 (software processing section) from the H/W accelerator 80 (hardware processing section) is reduced, so that the data transfer control load is reduced. In this embodiment, the steps S21 to S23 of the decoding processing shown in FIG. 4 are realized by software processing using the built-in CPU 70, and the steps S24 to S27 are realized by hardware processing using the H/W accelerator 80 for reasons the same as described above.

In this embodiment, the scanning processing for intraframe coding (I picture) is realized by software processing, and the scanning processing for interframe coding (P picture) is realized by hardware processing, as shown in FIG. 3. The reasons therefor are as follows.

Specifically, in the case of intraframe coding, since the DC prediction processing in the step S8 is performed by software processing, it is efficient to realize the scanning processing in the step S9 subsequent to the DC prediction processing by software processing. In the case of interframe coding, since the DC prediction processing is unnecessary, the scanning processing in the step S7 may be performed by hardware processing instead of software processing. Moreover, since the scanning processing in the step S7 is relatively simple processing, the scanning processing in the step S7 is suitable for hardware processing. Therefore, in this embodiment, the scanning processing in the step S7 is realized by hardware processing, and the scanning processing in the step S9 is realized by software processing. In this embodiment, in the decoding processing shown in FIG. 4, the inverse scanning processing in the step S22 is realized by software processing and the scanning processing in the step S24 is realized by hardware processing for reasons the same as described above.

As described above, this embodiment of the invention succeeds in realizing the multimedia processing by using a low-power consumption system, without increasing the clock frequency to a large extent, by assigning the roles to the built-in CPU 70 and the H/W accelerator 80 in a well-balanced manner.

3. FIFO Buffer

In this embodiment of the invention, the encoding processing and the decoding processing are realized by utilizing, as shown in FIGS. 6A and 6B, the FIFO (First In First Out) buffer 92, the decoding data buffer 93, the encoding data buffer 94, and the host buffer 96 shown in FIG. 2.

For example, when the multimedia processing program loaded into the memory 90 is the video encoding processing program, video data (video data for one VOP) obtained by using the camera 18 is written into the encoding data buffer 94 (MPEG-4 encoding buffer), as shown in FIG. 6A. When the host CPU 30 directs the H/W accelerator 80 to start executing the encoding processing, the H/W accelerator 80 executes the hardware processing portion of the encoding processing for the video data written into the encoding data buffer 94. The H/W accelerator 80 writes the resulting video data (video data after H/W encoding) into the FIFO buffer 92.

When the host CPU 30 directs the built-in CPU 70 to start executing the encoding processing program loaded into the memory 90, the built-in CPU 70 executes the software processing portion of the encoding processing for the video data (video data for one VOP) written into the FIFO buffer 92 based on the encoding processing program. The built-in CPU 70 writes the resulting video data (video data after S/W encoding) into the host buffer 96 (Huffman FIFO).

When the multimedia processing program loaded into the memory 90 is the video decoding processing program, the host CPU 30 writes the decoding target video data (video data for one VOP) into the host buffer 96, as shown in FIG. 6B. When the host CPU 30 directs the built-in CPU 70 to start executing the decoding processing program, the built-in CPU 70 executes the software processing portion of the decoding processing for the video data written into the host buffer 96 based on the decoding processing program. The built-in CPU 70 writes the resulting video data (video data after S/W decoding) into the FIFO buffer 92.

When the host CPU 30 directs the H/W accelerator 80 to start executing the decoding processing, the H/W accelerator 80 executes the hardware processing portion of the decoding processing for the video data (video data for one VOP) written into the FIFO buffer 92. The H/W accelerator 80 writes the resulting video data (video data after H/W decoding) into the decoding data buffer 93. The video data written into the decoding data buffer 93 is transferred to the display driver 16, and a video is displayed in the display panel 17.

In this embodiment, the FIFO buffer 92 is interposed between the built-in CPU 70 and the H/W accelerator 80, as shown in FIGS. 6A and 6B. This enables the software processing portion and the hardware processing portion to be efficiently executed by the built-in CPU 70 and the H/W accelerator 80 under control of the host CPU 30.

In the encoding processing shown in FIG. 6A, rate control for maintaining the bit rate is necessary when the amount of code after encoding is large. In this case, this embodiment realizes rate control by causing the host CPU 30 to create a skip frame. In more detail, when skipping the Kth frame (Kth VOP) for rate control, the host CPU 30 does not direct start of H/W encoding processing for video data in the Kth frame (direction to the H/W accelerator 80). As a result, the video data in the Kth frame after the H/W encoding processing is not written into the FIFO buffer 92, and the built-in CPU 70 does not perform the S/W encoding processing for the video data in the Kth frame.

The host CPU 30 directs the H/W accelerator 80 to start executing the H/W encoding processing for the subsequent (K+1)th frame ((K+1)th VOP), for example. As a result, the video data in the (K+1)th frame after the H/W encoding processing is written into the FIFO buffer 92, and the built-in CPU 70 executes the S/W encoding processing for the video data in the (K+1)th frame. In this case, the video data in the skipped Kth frame is not written into the FIFO buffer 92. Therefore, processing of disposing of or disregarding the video data in the Kth frame becomes unnecessary, so that smooth processing can be realized.

In this embodiment, when an error has occurred during the decoding processing of the built-in CPU 70 in the decoding processing shown in FIG. 6B, the built-in CPU 70 notifies the host CPU 30 of occurrence of an error by using a register or the like. When an error has occurred during the decoding processing of the built-in CPU 70, the host CPU 30 executes the software processing portion of the decoding processing in place of the built-in CPU 70. The host CPU 30 writes the video data after the S/W decoding processing into the FIFO buffer 92. This enables the H/W accelerator 80 to execute the H/W decoding processing for the written video data.

When an error has occurred during the decoding processing, it is necessary to analyze the video data (VOP). However, since the video data from the host CPU 30 is stored in the host buffer 96 (FIFO), the built-in CPU 70 cannot analyze an error by accessing the video data at an arbitrary address. On the other hand, since the video data has been transmitted from the host CPU 30, the host CPU 30 can analyze an error by accessing the video data stored in its memory at an arbitrary address. Therefore, even if an error has occurred during the decoding processing of the built-in CPU 70, the decoding processing can be completed by recovering from such an error.

4. Operation During Startup

The operation during startup according to the embodiment of the invention is described below with reference to a sequence diagram of FIG. 7.

The host CPU 30 initializes assistance processing of the built-in CPU 70. The host CPU 30 then causes the multimedia processing program to be loaded into the program loading area 91 of the memory 90. Specifically, the host CPU 30 selects a desired multimedia processing program (decoding program or encoding program) from the multimedia processing program group stored in the host memory 40, and causes the selected program to be loaded into the memory 90.

The host CPU 30 then performs protection processing for the program loading area 91 of the memory 90. This enables protection of the multimedia processing program loaded into the program loading area 91. Specifically, if the protection processing is not performed, a situation may occur in which the host CPU 30 or the built-in CPU 70 erroneously writes data or the like into the program loading area 91. If such a situation occurs, the loaded program is destroyed so that a problem such as a hang-up of the system occurs. Occurrence of such a problem can be prevented by protecting the program loading area 91.

The host CPU 30 then transmits an assistance function enable command, a clock enable command, and a reset release command, and transitions to a startup completion status reception wait state.

When the built-in CPU 70 has received the reset release command, the built-in CPU 70 is released from the reset state and performs an initialization setting such as boot processing. The built-in CPU 70 initializes (clears to zero) the work area 97 of the memory 90. When the startup has been completed, the built-in CPU 70 transmits a startup completion status to the host CPU 30 and transitions to an ACK reception wait state. When the built-in CPU 70 has received ACK transmitted from the host CPU 30, the built-in CPU 70 transitions to a decoding/encoding start command wait state.

Figure 7:
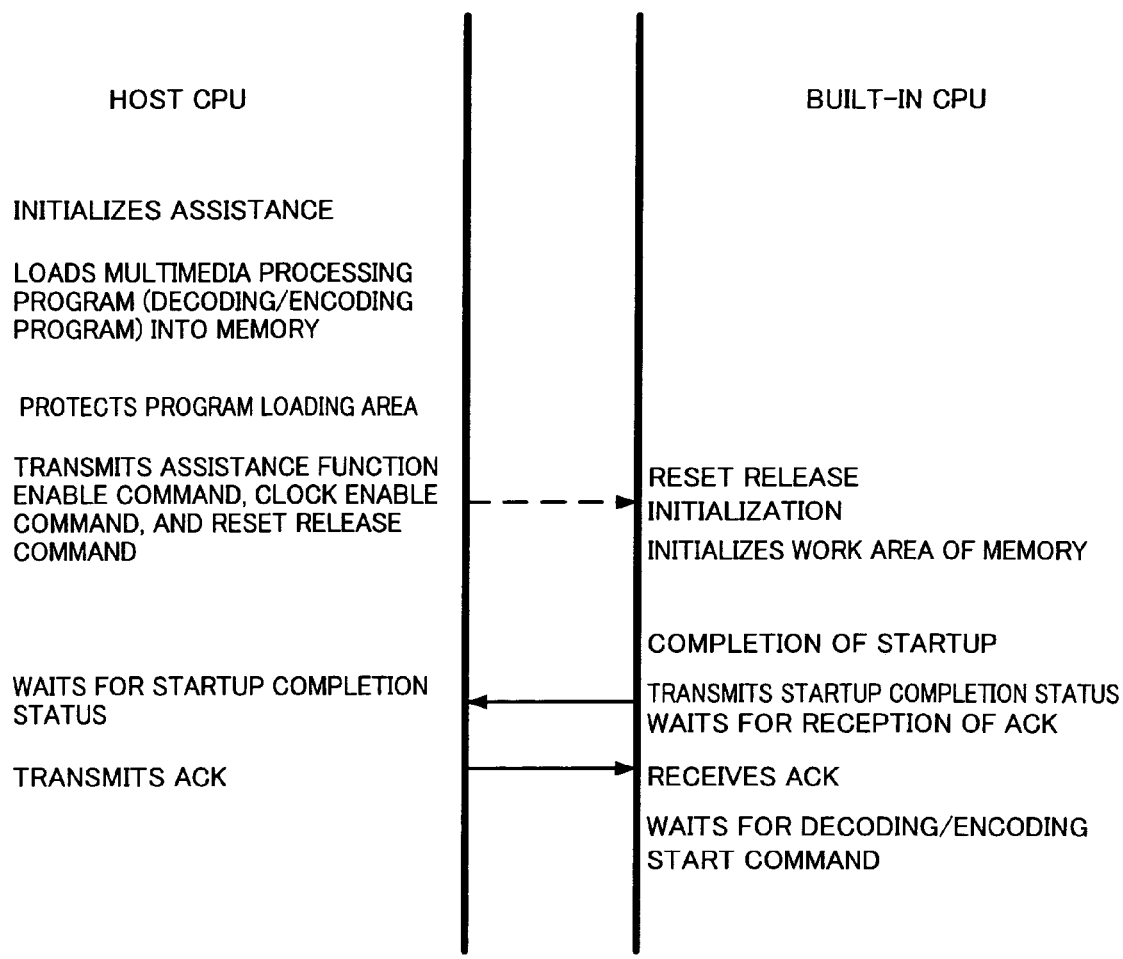
FIG. 7 is a sequence diagram during startup.

In this embodiment, the built-in CPU 70 is set in the reset state until the built-in CPU 70 receives the reset release command from the host CPU 30, as shown in FIG. 7. When the built-in CPU 70 has received the reset release command, the built-in CPU 70 is released from the reset state and executes the multimedia processing program. When the built-in CPU 70 then receives the reset command from the host CPU 30, the built-in CPU 70 is again set in the reset state. As described above, the built-in CPU 70 is released from the reset state each time the built-in CPU 70 executes the multimedia processing program, and the built-in CPU 70 is set in the reset state in the remaining period. Therefore, the operation of the built-in CPU 70 can be stopped in a period in which the built-in CPU 70 need not operate, whereby power consumption can be reduced. FIG. 7 shows an example using a method in which the multimedia processing program is executed when reset release is directed by the host CPU 30. However, a method may be used in which the multimedia processing program is executed when an interrupt from the host CPU 30 occurs.

5. Operation During Encoding Processing

Figure 8:
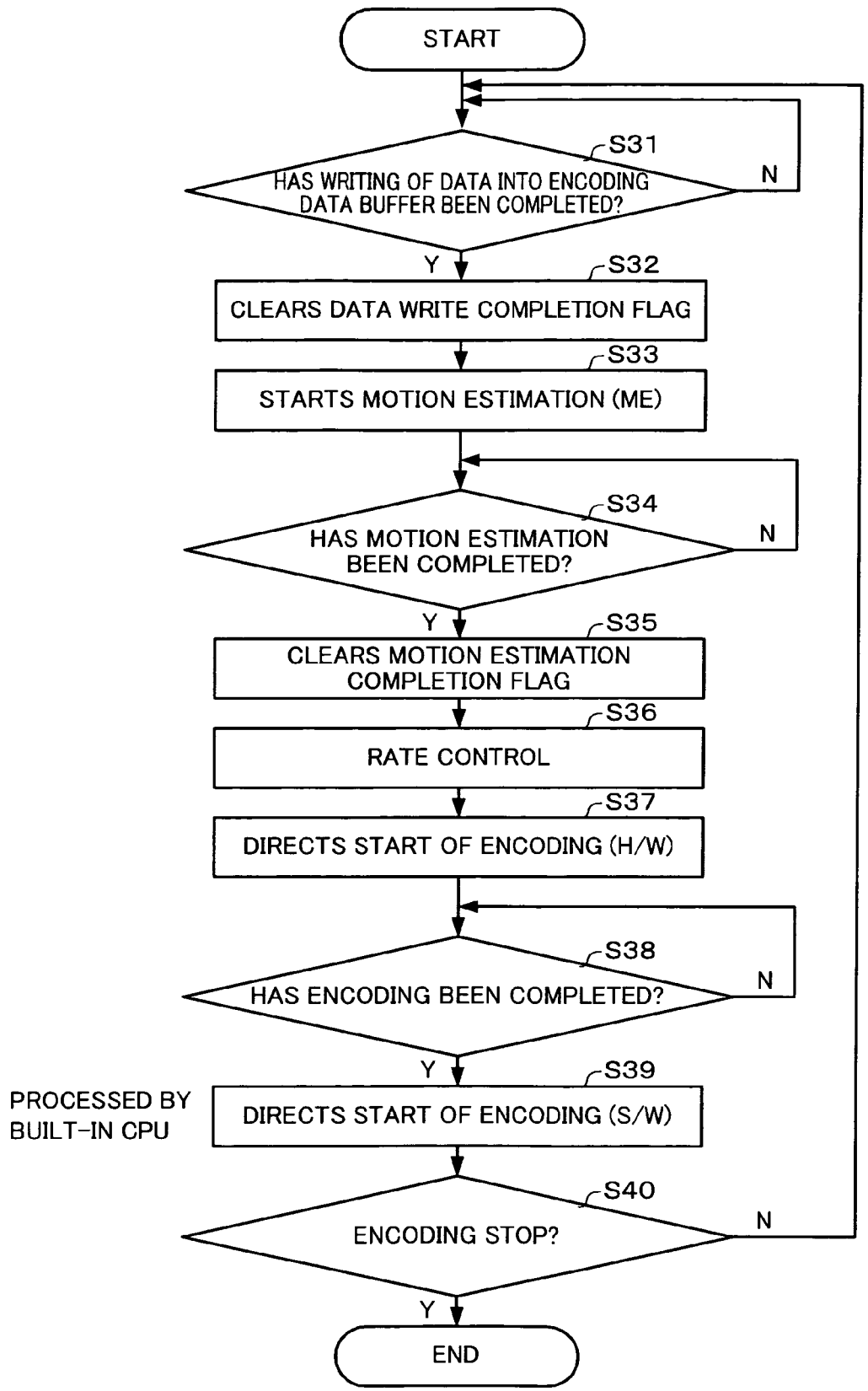
FIG. 8 is a flowchart of encoding processing.

The operation during encoding processing according to the embodiment of the invention is described below with reference to a flowchart of FIG. 8 and a sequence diagram of FIG. 9. FIG. 8 is a flowchart mainly illustrating the operation and the processing of the host CPU 30.

As shown in FIG. 8, the host CPU 30 determines whether or not writing of data (video data from the camera 18) into the encoding data buffer 94 has been completed (step S31). When writing of data has been completed, the host CPU 30 clears a data write completion flag (step S32), and directs start of motion estimation (ME) processing (step S33). When the host CPU 30 has determined that the motion estimation processing has been completed, the host CPU 30 clears a motion estimation completion flag (steps S34 and S35).

The host CPU 30 then performs rate control processing (step S36). Specifically, the host CPU 30 changes the quantization step of the quantization processing (step S2 in FIG. 3) based on the encoded data size. For example, the host CPU 30 increases the quantization step when the encoded data size is large. This increases the number of DCT coefficients (FIG. 5C) which become zero data after the quantization processing. On the other hand, the host CPU 30 decreases the quantization step when the encoded data size is small. This reduces the number of DCT coefficients which become zero data after the quantization processing.

Then, the host CPU 30 sets a QP value (quantization parameter) to direct start of H/W encoding processing (step S37). This causes the H/W accelerator 80 to execute H/W encoding processing. When the host CPU 30 has determined that the H/W encoding processing has been completed, the host CPU 30 directs the built-in CPU 70 to start S/W encoding processing (steps S38 and S39). The host CPU 30 then determines whether or not an encoding stop has been reached. When the host CPU 30 has determined that an encoding stop has not been reached, the host CPU 30 returns to the step S31. When the host CPU 30 has determined that an encoding stop has been reached (when a specific number of frames have been encoded), the host CPU 30 finishes the processing (step S40).

Figure 9:
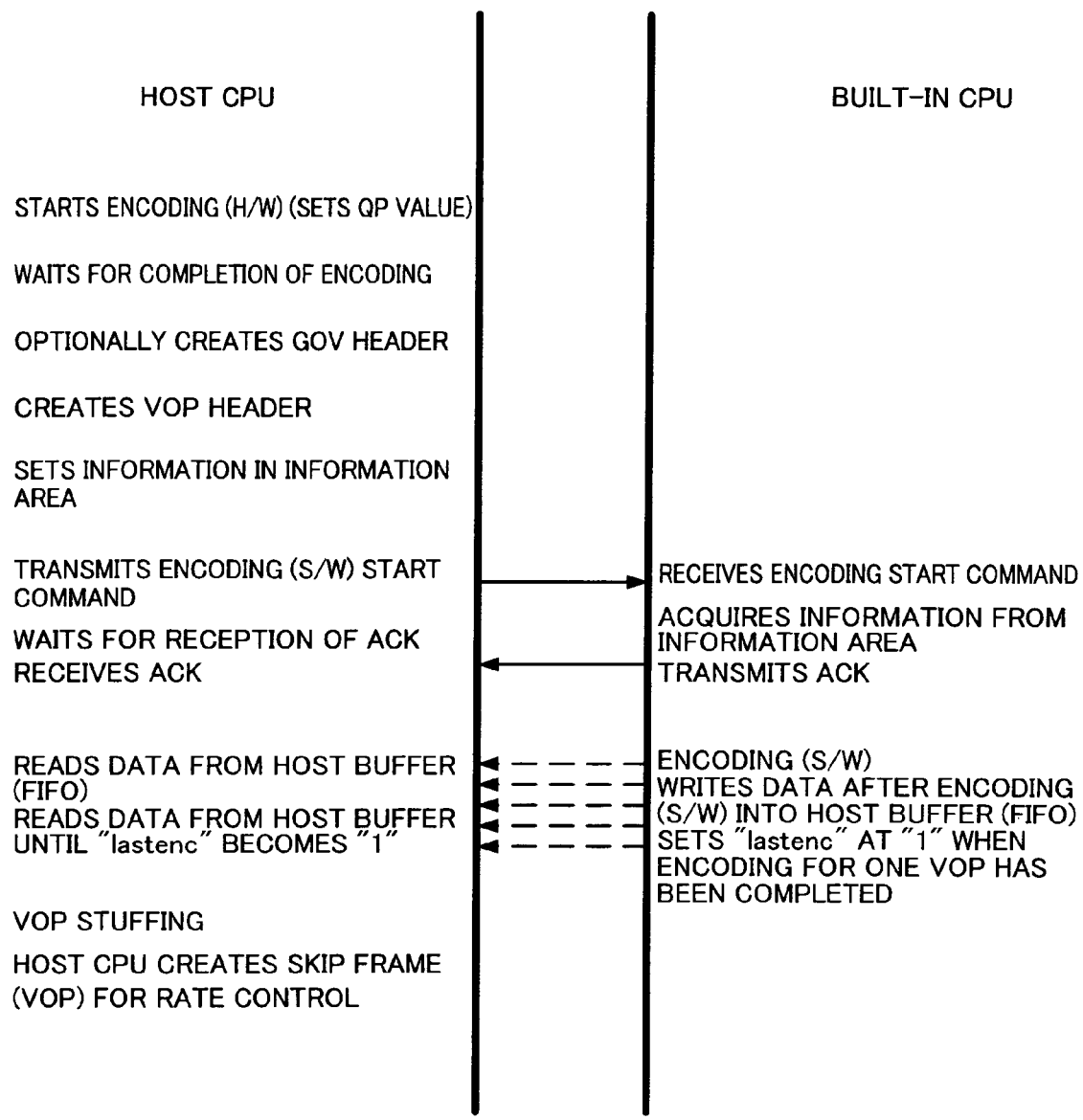
FIG. 9 is a sequence diagram of encoding processing.

The sequence diagram of FIG. 9 is described below. The host CPU 30 sets the QP value to direct the H/W accelerator 80 to start H/W encoding processing, and waits for completion of the H/W encoding processing. When the H/W encoding processing has been completed, the host CPU 30 optionally creates a Group of VOP (GOV) header. The host CPU 30 creates a video object plane (VOP) header, and sets various types of information necessary for encoding in the information area 99 of the memory 90.

FIG. 10A shows an example of information set in the information area 99 during the encoding processing. The built-in CPU 70 can realize appropriate encoding processing by being notified of the information shown in FIG. 10A from the host CPU 30.

The host CPU 30 then transmits an S/W encoding processing start command and transitions to an ACK reception wait state. When the built-in CPU 70 has transmitted ACK, the host CPU 30 receives ACK. The built-in CPU 70 then starts S/W encoding processing and writes processed data (video data) into the host buffer 96 (FIFO). When the encoding processing for one VOP (one frame in a broad sense) has been completed, the built-in CPU 70 sets "lastenc" at "1".

The host CPU 30 reads data from the host buffer 96 (FIFO). Specifically, the host CPU 30 reads data (Huffman data) from the host buffer 96 until "lastenc" becomes "1". The host CPU 30 performs VOP stuffing for byte alignment. The host CPU 30 creates a skip frame (VOP) for rate control.

6. Operation During Decoding Processing

Figure 11:
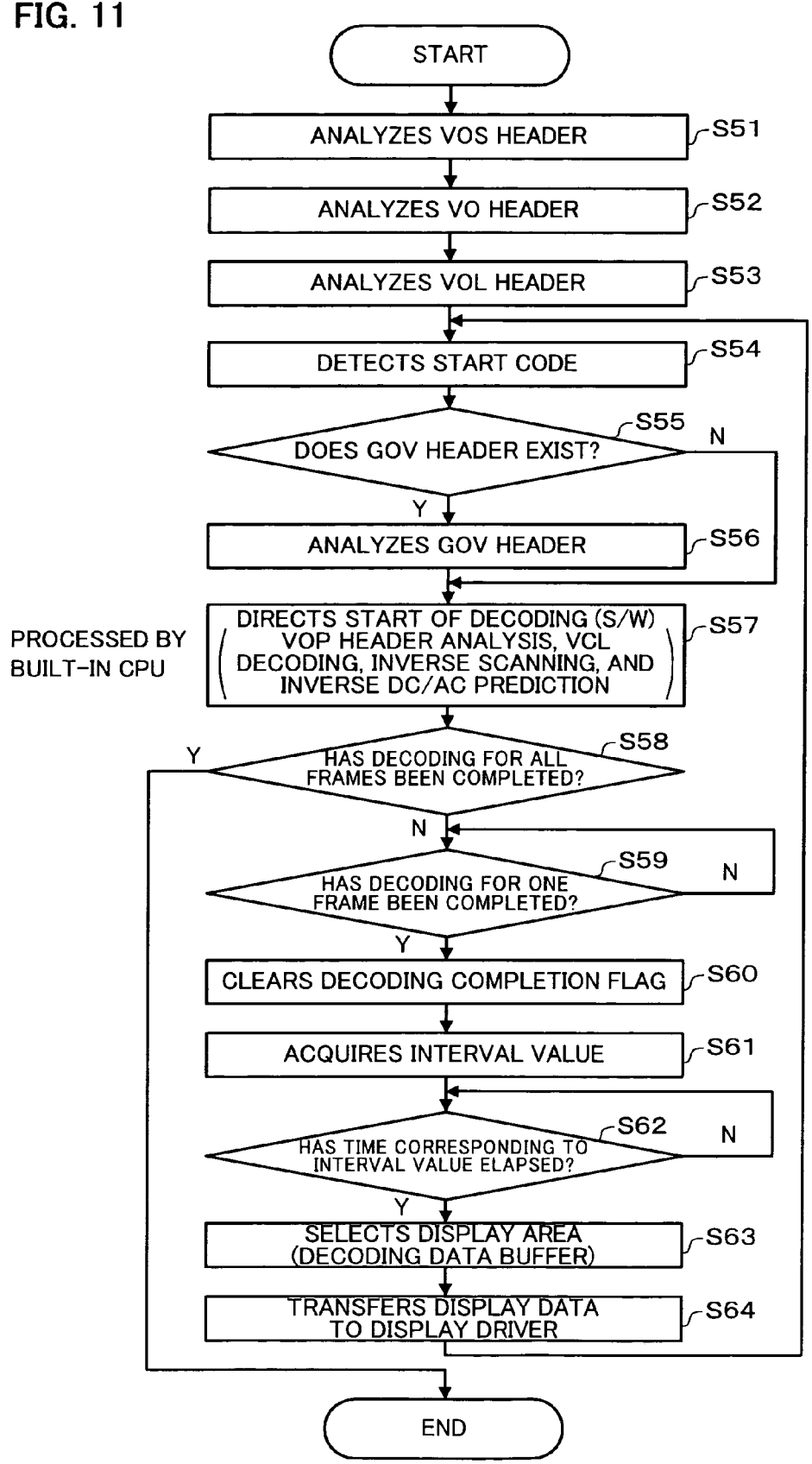
FIG. 11 is a flowchart of decoding processing.

The operation during decoding processing according to the embodiment of the invention is described below with reference to a flowchart of FIG. 11 and a sequence diagram of FIG. 12. FIG. 11 is a flowchart mainly illustrating the operation and the processing of the host CPU 30.

As shown in FIG. 11, the host CPU 30 analyzes a video object sequence (VOS) header, a video object (VO) header, and a video object layer (VOL) header (steps S51, S52, and S53). The host CPU 30 then detects a start code (step S54). When a GOV header exists, the host CPU 30 analyzes the GOV header (steps S55 and S56).

The host CPU 30 then directs start of S/W decoding processing (step S57). This causes the built-in CPU 70 to perform VOP header analysis processing, VCL decoding processing, inverse scanning processing, and inverse DC/AC prediction processing.

The host CPU 30 determines whether or not the decoding processing for all the frames (VOPs) has been completed (step S58). When the host CPU 30 has determined that the decoding processing for all the frames has been completed, the host CPU 30 finishes the processing. When the host CPU 30 has determined the decoding processing for all the frames has not been completed, the host CPU 30 determines whether or not the decoding processing for one frame has been completed (step S59). When the host CPU 30 has determined the decoding processing for one frame has been completed, the host CPU 30 clears a decoding completion flag (step S60).

The host CPU 30 then acquires an interval value, and determines whether or not the time corresponding to the interval value (time corresponding to the frame rate) has elapsed (steps S61 and S62). When the host CPU 30 has determined that the time corresponding to the interval value has elapsed, the host CPU 30 selects the display area (first or second buffer of the decoding data buffer 93 having a double buffer structure) (step S63), and transfers display data (image data) of the selected display area to the display driver 16 (step S64).

The host CPU 30 performs upper-layer header analysis (VOS, VO, VOL, and GOV header analysis) of an MPEG stream (stream data in a broad sense), as indicated by the steps S51 to S56 in FIG. 11. On the other hand, the built-in CPU 70 performs lower-layer header analysis (VOP header analysis) of an MPEG stream. Such a role assignment enables the MPEG decoding processing to be efficiently performed under control of the host CPU 30.

Figure 12:
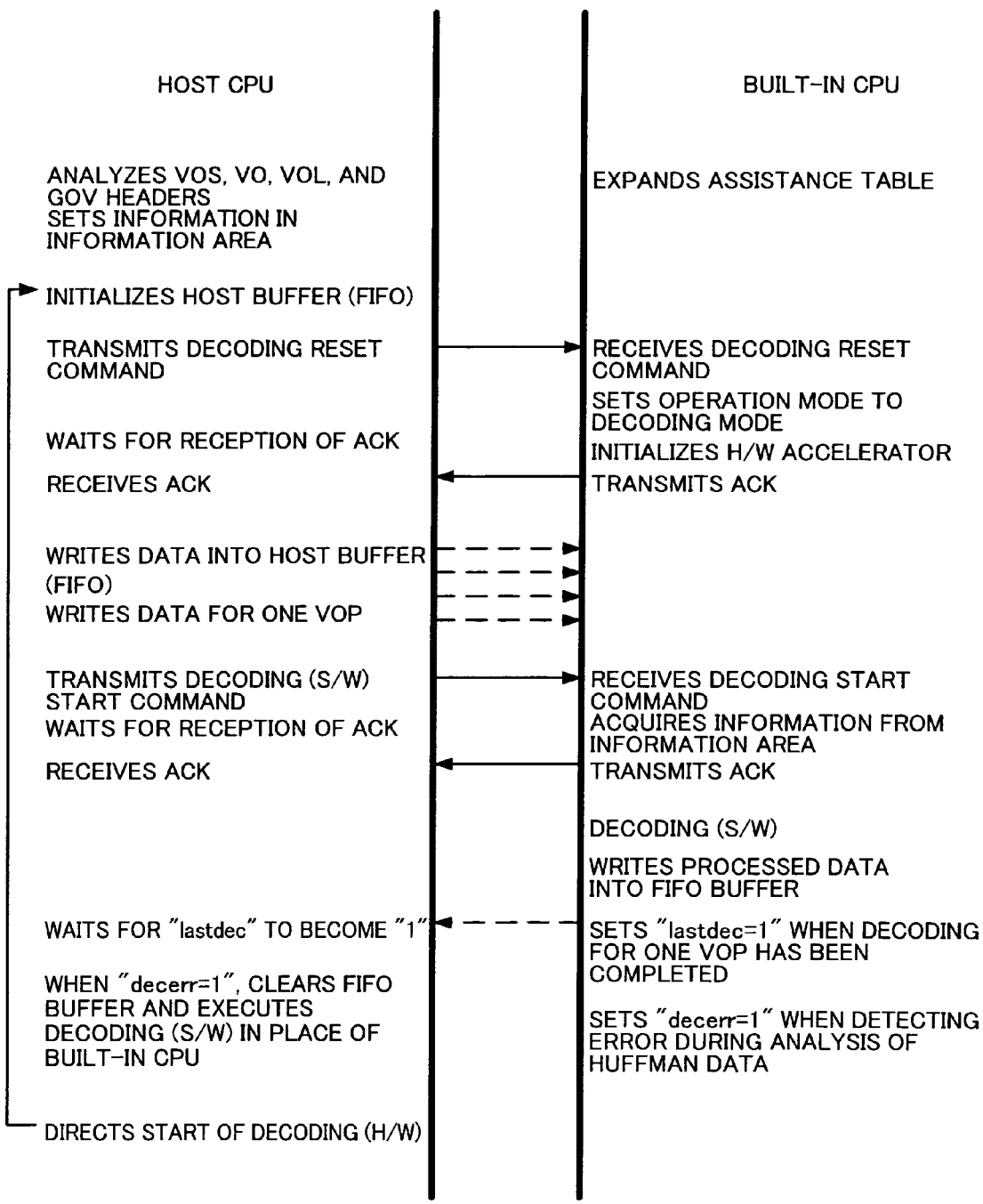
FIG. 12 is a sequence diagram of decoding processing.

The sequence diagram of FIG. 12 is described below. The host CPU 30 analyzes the VOS, VO, VOL, and GOV headers and sets information (data or parameter) in the information area 99. The host CPU 30 initializes the host buffer 96 (FIFO).

The host CPU 30 then transmits a decoding reset command and transitions to an ACK reception wait state. When the built-in CPU 70 has received the decoding reset command from the host CPU 30 after expanding the assistance table, the built-in CPU 70 sets the operation mode to a decoding mode. The built-in CPU 70 initializes the H/W accelerator and transmits ACK.

When the host CPU 30 has received ACK, the host CPU 30 writes data (Huffman data) into the host buffer 96. Specifically, the host CPU 30 writes data for one VOP into the host buffer 96.

The host CPU 30 then transmits an S/W decoding start command and transitions to an ACK reception wait state. When the built-in CPU 70 has received the decoding start command, the built-in CPU 70 acquires information set in the information area 99 and transmits ACK, and the host CPU 30 receives ACK.

FIG. 10B shows an example of information set in the information area 99 during the decoding processing. The built-in CPU 70 can realize appropriate decoding processing by being notified of the information shown in FIG. 10B from the host CPU 30.

The built-in CPU 70 then starts S/W decoding processing. The built-in CPU 70 writes the processed data into the FIFO buffer 92. When the decoding processing of data for one VOP has been completed, the built-in CPU 70 sets "lastdec" at "1". When the built-in CPU 70 has detected an error during analysis of Huffman data, the built-in CPU 70 sets "decerr" at "1".

The host CPU 30 waits until "lastdec" becomes "1". When "lastdec" has become "1", the host CPU 30 checks "decerr". When "decerr=1", the host CPU 30 clears the FIFO buffer 92 and executes S/W decoding processing in place of the built-in CPU 70.

The host CPU 30 then directs start of H/W decoding processing. After the host CPU 30 has directed start of H/W decoding processing, the host CPU 30 again performs the initialization processing of the host buffer 96.

When an error has occurred during the S/W decoding processing, the host CPU 30 executes the S/W decoding processing in place of the built-in CPU 70, as shown in FIG. 12. Therefore, even if an error has occurred, the decoding processing can be completed by recovering from such an error and transitioning to the H/W decoding processing.

7. Handshake Communication

In the embodiment of the invention, command and status transfer between the host CPU 30 and the built-in CPU 70 is realized by handshake communication using registers (output register and input register). These registers may be provided in the host I/F 60.

The handshake communication according to this embodiment is described below with reference to flowcharts shown in FIGS. 13 and 14. FIG. 15 shows examples of a command and status transferred by the handshake communication.

Figure 13:
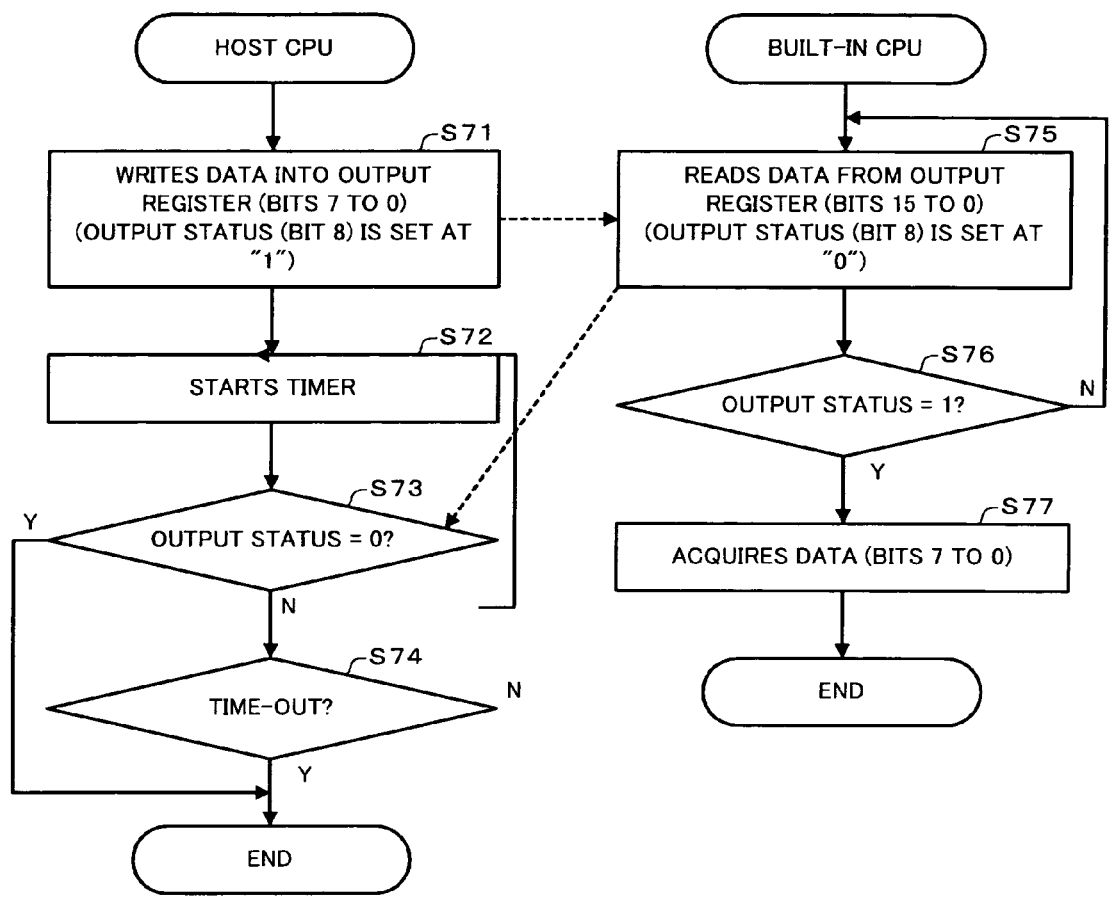
FIG. 13 is illustrative of handshake communication using registers.

FIG. 13 is a flowchart when transmitting (outputting) data (command or status) to the built-in CPU 70 from the host CPU 30. The host CPU 30 writes data into the output register (bits 7 to 0) (step S71). This write operation causes output status (bit 8) to be automatically set at "1".

The host CPU 30 starts a timer (step S72), and waits until the output status becomes "0" (step S73). The host CPU 30 finishes the processing when the output status has become "0". When the output status has not become "0", the host CPU 30 determines whether or not the timer started in the step S72 has reached a time-out (step S74). When the timer has not reached a time-out, the host CPU 30 returns to the step S73. When the timer has reached a time-out, the host CPU 30 finishes the processing.

The built-in CPU 70 reads data from the output register (bits 15 to 0) (step S75). This read operation causes the output status (bit 8) to be automatically set at "0".

The built-in CPU 70 then determines whether or not the output status has been set at "1" during reading in the step S75 (step S76). When the output status has not been set at "1", the built-in CPU 70 returns to the step S75 and again reads data from the output register (bits 15 to 0). When the host CPU 30 has written data into the output register (bits 7 to 0) in the step S71 and the output status has become "1", the host CPU 30 acquires the data (bits 7 to 0) from the output register (step S77).

Figure 14:
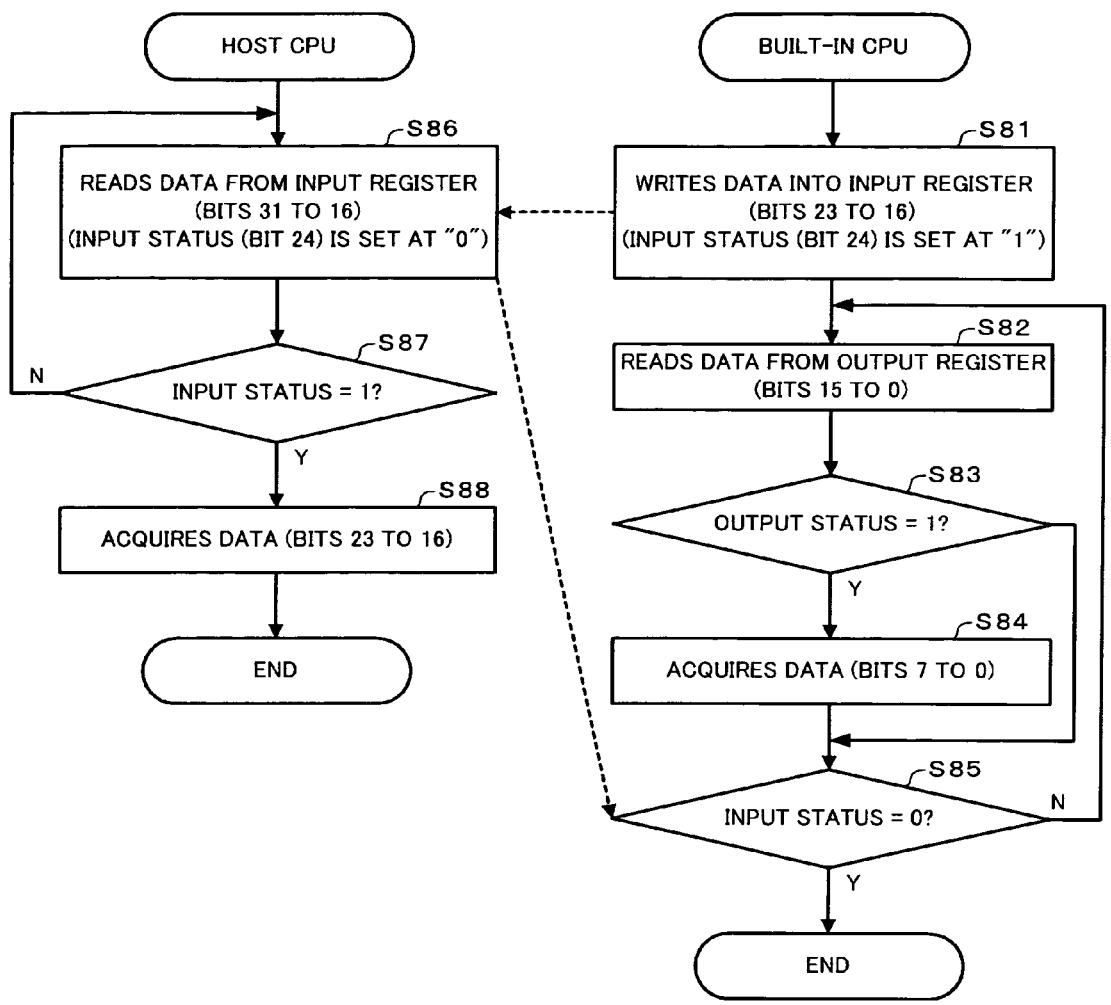
FIG. 14 is illustrative of handshake communication using registers.

FIG. 14 is a flowchart when the host CPU 30 receives (input) data (command or status) from the built-in CPU 70. The built-in CPU 70 writes data into the input register (bits 23 to 16) (step S81). This write operation causes input status (bit 24) to be automatically set at "1". The built-in CPU 70 then reads data from the output register (bits 15 to 0) (step S82). The built-in CPU 70 determines whether or not the output status is "1" (step S83). When the output status is "1", the built-in CPU 70 acquires data (bits 7 to 0) from the output register (step S84). The built-in CPU 70 determines whether or not the input status is "0" (step S85). When the built-in CPU 70 has determined that the input status is not "0", the built-in CPU 70 returns to the step S82. When the built-in CPU 70 has determined that the input status is "0", the built-in CPU 70 finishes the processing.

The host CPU 30 reads data from the input register (bits 31 to 16) (step S86). This read operation causes the input status (bit 24) to be automatically set at "0". The host CPU 30 then determines whether or not the input status is "1" (step S87). When the host CPU 30 has determined that the input status is not "1", the host CPU 30 returns to the step S86 and again reads data from the input register. When the built-in CPU 70 has written data into the input register in the step S81 and the input status has become "1", the host CPU 30 acquires data (bits 23 to 16) from the input register (step S88).

The invention is not limited to the above-described embodiments, and various modifications can be made within the scope of the invention. For example, any term (such as a host CPU, a built-in CPU, a VOP, or a portable telephone) cited with a different term having broader or the same meaning (such as a host processor, a built-in processor, a frame, or an electronic instrument) at least once in this specification or drawings can be replaced by the different term in any place in this specification and drawings.

The configurations of the electronic instrument, the multimedia processing system, and the display controller according to the invention are not limited to the configurations described with reference to FIGS. 1 and 2, for example. Various modifications and variations may be made as to the configurations of the electronic instrument, the multimedia processing system, and the display controller. For example, some of the constituent elements in the drawings may be omitted, or the connection relationship between the constituent elements may be changed. The encoding processing and the decoding processing realized according to the invention are not limited to the encoding processing and the decoding processing shown in FIGS. 3 and 4. Various modifications and variations may be made according to the MPEG standard and the like.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A display controller that performs multimedia processing, the multimedia processing being encoding or decoding processing of video data, still image data, or sound data, the display controller comprising:

a host interface that performs interface processing between the display controller and a host processor;

a memory into which a multimedia processing program is loaded, when the host processor has read the multimedia processing program from a multimedia processing program group stored in a host memory and the host processor transmitted the multimedia processing program to the display controller;

a processor that executes a software processing portion of the multimedia processing assigned to software processing based on the multimedia processing program loaded in the memory; and a first hardware accelerator that executes a hardware processing portion of the multimedia processing assigned to hardware processing, the processor being released from a reset state when the host processor has directed reset release, and executing the multimedia processing program after being released from the reset state, the multimedia processing program being an encoding processing program that executes a software processing portion of encoding processing of the video data; the first hardware accelerator performing discrete cosine transform processing, quantization processing, inverse quantization processing, inverse discrete cosine transform processing, motion compensation processing, and motion estimation processing as the hardware processing portion; and the processor performing variable length code encoding processing as the software processing portion.

2. The display controller as defined in claim 1, the processor transitioning to a command wait state, in which the processor waits for reception of a command from the host processor, after being released from the reset state, and the processor executing the multimedia processing program when the processor has been directed by the host processor to start executing the multimedia processing program in the command wait state.

3. The display controller as defined in claim 1, the first hardware accelerator performing scanning processing in the case of interframe coding, and the processor performing DC prediction processing and scanning processing in the case of intraframe coding.

4. The display controller as defined in claim 1,
the multimedia processing program being an encoding processing program that executes a software processing portion of encoding processing of the video data,
when the first hardware accelerator has been directed by the host processor to start executing the encoding processing, the first hardware accelerator executing the hardware processing portion of the encoding processing of the video data written into an encoding data buffer, and the first hardware accelerator writing the resulting video data into a FIFO buffer, and
when the processor has been directed by the host processor to start executing the encoding processing program, the processor executing the software processing portion of the encoding processing of the video data written into the FIFO buffer based on the encoding processing program, and the processor writing the resulting video data into a host buffer.

5. The display controller as defined in claim 1, when the first hardware accelerator has been directed by the host processor to start executing the encoding processing, the first hardware accelerator executing the hardware processing portion of the encoding processing of the video data written into an encoding data buffer, and the first hardware accelerator writing the resulting video data into a FIFO buffer, and when the processor has been directed by the host processor to start executing the encoding processing program, the processor executing the software processing portion of the encoding processing of the video data written into the FIFO buffer based on the encoding processing program, and the processor writing the resulting video data into a host buffer.

6. The display controller as defined in claim 1,
the multimedia processing program being a decoding processing program that executes a software processing portion of decoding processing of the video data,
the processor performing variable length code decoding processing as the software processing portion based on the decoding processing program, and
the first hardware accelerator performing inverse quantization processing, inverse discrete cosine transform processing, and motion compensation processing as the hardware processing portion.

7. The display controller as defined in claim 6,
the processor performs inverse scanning processing and inverse DC/AC prediction processing in the case of intraframe coding, and
the first hardware accelerator performing inverse scanning processing in the case of interframe coding.

8. The display controller as defined in claim 6,
when the processor has been directed by the host processor to start executing the decoding processing program, the processor executing the software processing portion of the decoding processing of the video data written into a host buffer based on the decoding processing program, and the processor writing the resulting video data into a FIFO buffer, and
when the first hardware accelerator has been directed by the host processor to start executing the decoding processing, the first hardware accelerator executing the hardware processing portion of the decoding processing of the video data written into the FIFO buffer, and the first hardware accelerator writing the resulting video data into a decoding data buffer.

9. The display controller as defined in claim 6,
when an error has occurred during the decoding processing, the processor notifying the host processor of occurrence of the error and the processor allowing the host processor to execute the software processing portion of the decoding processing.

10. The display controller as defined in claim 6, comprising:
a second hardware accelerator controlled by the processor and assisting a part of the software processing portion of the multimedia processing.

11. The display controller as defined in claim 1,
the multimedia processing program being a decoding processing program that executes a software processing portion of decoding processing of the video data,
when the processor has been directed by the host processor to start executing the decoding processing program, the processor executing the software processing portion of the decoding processing of the video data written into a host buffer based on the decoding processing program, and the processor writing the resulting video data into a FIFO buffer; and
when the first hardware accelerator has been directed by the host processor to start executing the decoding processing, the first hardware accelerator executing the hardware processing portion of the decoding processing of the video data written into the FIFO buffer, and the first hardware accelerator writing the resulting video data into a decoding data buffer.

12. The display controller as defined in claim 11,
when an error has occurred during the decoding processing, the processor notifying the host processor of occurrence of the error and the processor allowing the host processor to execute the software processing portion of the decoding processing.

13. The display controller as defined in claim 1,
the multimedia processing program being a decoding processing program that executes a software processing portion of decoding processing of the video data, and
when an error has occurred during the decoding processing, the processor notifying the host processor of occurrence of the error and the processor allowing the host processor to execute the software processing portion of the decoding processing.

14. The display controller as defined in claim 1, comprising:
a second hardware accelerator controlled by the processor and assisting a part of the software processing portion of the multimedia processing.

15. The display controller as defined in claim 1, comprising:
a second hardware accelerator controlled by the processor and assisting a part of the software processing portion of the multimedia processing.

* * * * *